United States Patent
Matthews et al.

(10) Patent No.: US 8,886,363 B2
(45) Date of Patent: Nov. 11, 2014

(54) ENERGY STORAGE AND POWER MANAGEMENT SYSTEM

(75) Inventors: Mark Matthews, Fairport, NY (US); Hari Nayar, Fairport, NY (US)

(73) Assignee: Arista Power Inc., Rochester, NY (US)

(*) Notice: Subject to any disclaimer, the term of this patent is extended or adjusted under 35 U.S.C. 154(b) by 423 days.

(21) Appl. No.: 13/359,643

(22) Filed: Jan. 27, 2012

(65) Prior Publication Data
US 2012/0197452 A1    Aug. 2, 2012

Related U.S. Application Data

(60) Provisional application No. 61/438,779, filed on Feb. 2, 2011.

(51) Int. Cl.
| | | |
|---|---|---|
| *G05D 3/12* | (2006.01) | |
| *G05D 5/00* | (2006.01) | |
| *G05D 9/00* | (2006.01) | |
| *G05D 11/00* | (2006.01) | |
| *G05D 17/00* | (2006.01) | |
| *H02J 3/38* | (2006.01) | |
| *H02J 3/00* | (2006.01) | |
| *H02J 3/32* | (2006.01) | |

(52) U.S. Cl.
CPC ............... *H02J 3/383* (2013.01); *H02J 3/008* (2013.01); *H02J 3/32* (2013.01); *H02J 3/386* (2013.01); *Y02E 70/30* (2013.01); *Y04S 50/10* (2013.01); *Y02E 10/563* (2013.01); *Y02E 10/566* (2013.01); *Y02E 10/763* (2013.01)
USPC ............ 700/295; 700/286; 700/291; 700/297

(58) Field of Classification Search
CPC ............ H02J 3/008; H02J 3/32; H02J 3/386; H02J 3/383; Y02E 70/30; Y02E 10/763; Y02E 10/563; Y02E 10/566; Y04S 50/10
USPC ................... 700/22, 286, 291–293, 295, 297
See application file for complete search history.

(56) References Cited

U.S. PATENT DOCUMENTS

| | | | | |
|---|---|---|---|---|
| 5,270,913 A | * | 12/1993 | Limpaecher | 363/140 |
| 5,731,688 A | * | 3/1998 | Thomson | 322/22 |
| 6,512,966 B2 | * | 1/2003 | Lof et al. | 700/291 |

(Continued)

FOREIGN PATENT DOCUMENTS

| | | |
|---|---|---|
| WO | 2008/058284 | 5/2008 |
| WO | 2009/155445 | 12/2009 |

OTHER PUBLICATIONS

European Search Report, European Patent Application 12152896.2, Jun. 27, 2012.

*Primary Examiner* — Ramesh Patel
(74) *Attorney, Agent, or Firm* — Dekel Patent Ltd.; David Klein

(57) ABSTRACT

A system to manage the storage of energy to, and the release of energy from, an energy storage system with such energy being generated from one or more renewable sources of energy, traditional sources of energy or the electric grid, or a combination of any or all of these sources, resulting in a reduction of the power demand from the electric grid of a user of the system and/or of the high consumption charges during peak usage times of a user of the system.

17 Claims, 3 Drawing Sheets

(56) References Cited

U.S. PATENT DOCUMENTS

| | | | |
|---|---|---|---|
| 6,590,304 B1* | 7/2003 | Manning et al. | 307/131 |
| 6,738,692 B2* | 5/2004 | Schienbein et al. | 700/286 |
| 2003/0047209 A1 | 3/2003 | Yanai | |
| 2010/0264739 A1* | 10/2010 | Errington | 307/80 |
| 2010/0327800 A1 | 12/2010 | Reineccius | |
| 2012/0044014 A1* | 2/2012 | Stratakos et al. | 327/530 |
| 2012/0098350 A1* | 4/2012 | Campanella et al. | 307/104 |
| 2013/0207591 A1* | 8/2013 | Reineccius | 320/101 |

* cited by examiner

ENERGY STORAGE AND POWER MANAGEMENT SYSTEM

FIELD AND BACKGROUND OF THE INVENTION

The present invention relates to an energy storage and power management system, including programming code and algorithms for the power management system, and, more particularly, to a system to manage the storage of energy to, and the release of energy from, an energy storage system with such energy being generated from one or more sources such as solar, wind, fuel cell generator, other types of generators included but not limited to diesel, natural gas, bio mass, combined heat and power, etc., other types of renewable sources or the electric grid, or a combination of any or all of these sources, resulting in a reduction of the power demand from the electric grid of a user of the system and/or of the high consumption charges during peak usage times of a user of the system.

Many electricity suppliers, typically utility companies, throughout much of the United States and abroad charge their commercial customers not only for the consumption of electricity but also a demand, or distribution, charge. The calculation of this demand charge varies from supplier to supplier, but is generally based upon the peak power demand that a customer uses from the electric grid in a billing cycle—often called peak demand. Recently, demand charges have become an increasing part of commercial customer's electricity costs. Certain electricity suppliers have begun to charge residential customers demand charges, and that charge is expected to be implemented by additional electricity suppliers.

Additionally, unrelated to demand charges, electricity suppliers often charge a higher rate for the consumption of electricity for commercial and residential customers during certain times of day when overall demand on the electricity supplier is often high, which is often during the early afternoon hours.

It is commonly known to those skilled in the art when it is most advantageous to use a particular source of energy, whether generated by one or more renewable energy sources, the electric grid, other sources or any combination thereof and whether or not such energy has been stored in an energy storage system. This is most advantageous to receive improved consideration if selling such energy, or to reduce energy costs either by reducing demand charges or by reducing consumption charges if using such energy.

Recently, interest has increased in using renewable energy sources for reasons that include, but are not limited to, increased demands for energy, increased costs of energy, increased desire for energy independence, the availability of government subsidies and increased public concerns about pollution from fossil fuels. Two of the most common and best-developed renewable energy sources are solar energy and wind energy, although many others exist now and are expected to be developed in the future. One of the biggest challenges for implementing wide-spread use of renewable energy sources is that renewable energy sources typically provide a variable and somewhat unpredictable energy supply. The amount of energy generated by a renewable energy source could vary because of reasons such as varied wind conditions and availability of sunlight, each overall for a particular site or for a particular day or time. This variability of when and how much the renewable energy sources generate energy makes it difficult to use the energy created from the renewable energy sources when the end user will receive superior financial benefits from that energy.

SUMMARY AND OBJECTS OF THE INVENTION

An embodiment of the present invention is an energy storage and power management system, including programming code and algorithms for the power management system. The energy storage and power management system is made of several components that enable an end user of energy at the local level to store energy created by one or more renewable energy sources, the electric grid, other energy generation sources, including but not limited to generators, including but not limited to diesel, natural gas or bio mass or any combination thereof in energy storage devices and to release such stored energy at times and/or amounts to receive improved financial benefit when such energy is used for the end user's power load or released into the electric grid in order (a) to reduce the end user's power demand from the electric grid when the end user's power loads are high or expected to be high and/or (b) to reduce consumption charges during the utility company's higher usage times when consumption rates are often high. An end user of energy at the local level would include, but is not limited to, a commercial building, a relatively small group of commercial buildings, a residential building, a single or a relatively small group of apartment buildings, a farm, a commercial factory, a government building or any other individual or small amount of free-standing structures that are connected to the electric grid.

By using the invention, the end user's peaks of power demand from the electric grid will be reduced by releasing stored energy when the end user's power demand from the electric grid is, or is expected to be, at its greatest. By reducing its highest demand, or peak demand, from the electric grid over a period of time, typically a billing cycle from the electricity provider, the end user can receive cost savings from the utility company by reducing its demand charges, distribution charges or other similar charges that are often charged by utility companies. In addition or alternatively, an end user can receive cost savings by using stored energy instead of energy from the electric grid when the overall usage of electricity from the electric grid is relatively high and the corresponding consumption charges are relatively high.

Prior attempts to maximize the value of energy, whether from renewable sources, other energy sources, the electric grid or a combination thereof and whether or not utilizing stored energy storage systems, did not focus on using such energy to decrease a local customer's power demand charge, distribution charge or similar charge from a utility company, and/or to offset high consumption charges during peak usage times or a combination thereof. Instead, prior attempts focused on such matters as storing energy for back-up energy purposes or managing energy for larger-scale systems such as multi-user systems, wind farms or the electric grid itself in order to improve the value of such energy.

By use of the energy storage and power management system, energy generated by one or more renewable energy sources such as wind or solar, or other sources of energy generation such as the electric grid, generators or any combination of the foregoing, may be stored in the energy storage system, generally over the course of hours or even days. The energy storage and power management system determines when and to what extent to discharge this energy that is stored in the energy storage system, and/or when and to what extent to charge the energy storage system.

The key components of the system are not only the energy storage and power distribution but also the integration of the power management system into the facility to allow load tracking and related functions and the analysis and system controls that are implemented through algorithms and source code. By monitoring the customer's real-time energy usage, the power management system releases power/energy stored when it is of the highest value to the customer and also enables battery charging not only at night but during off-peak times during the day when the cost of energy is relatively low. Therefore, the power management system, including energy storage, power distribution, facility monitoring, system controls (software/algorithm) and component integration, can be combined in a customized manner to optimize energy cost savings and the corresponding reduction of the electricity bill of the end user.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Figure 1:
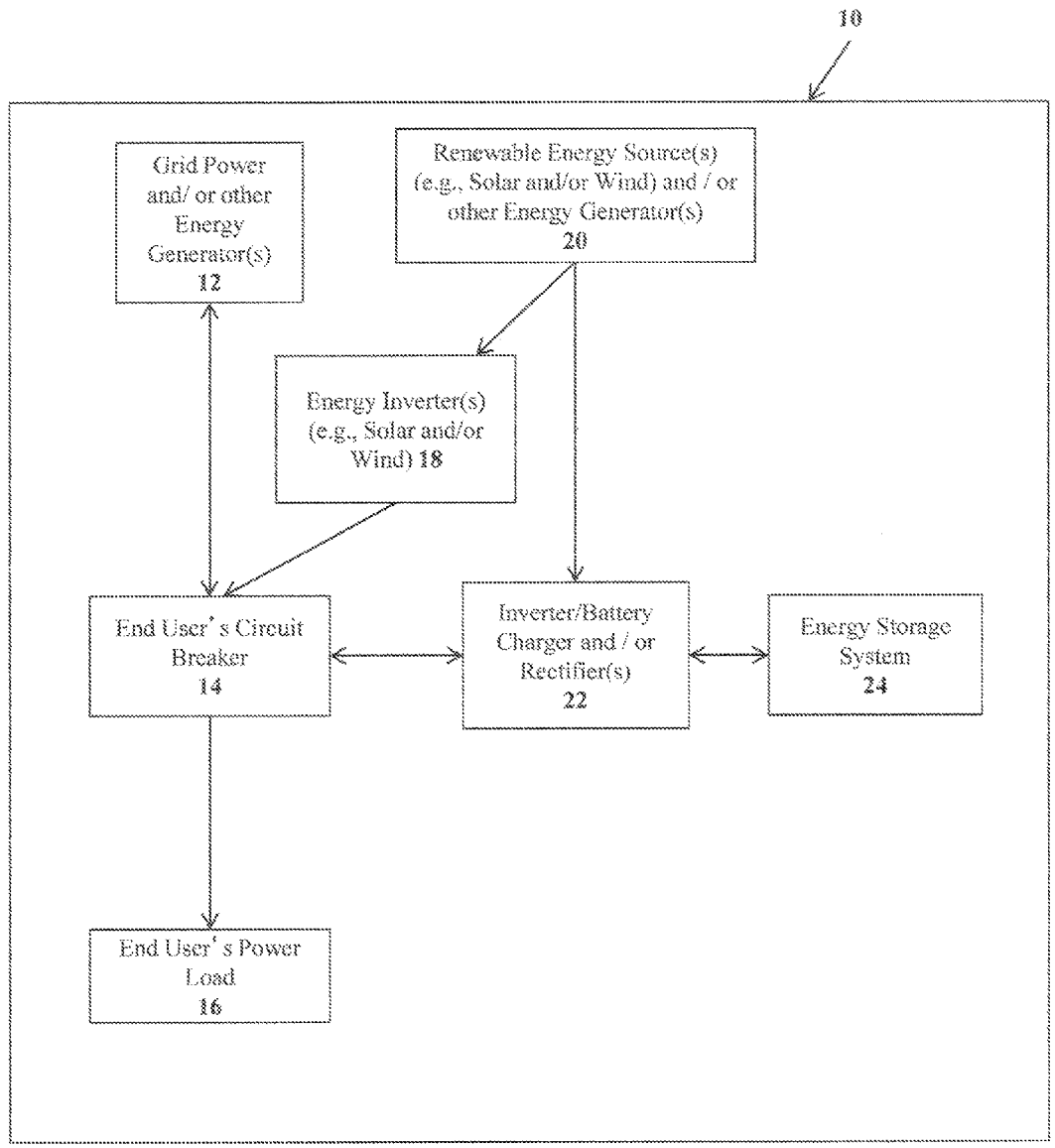
FIG. 1 is a schematic representation of the present invention.

In describing the preferred embodiments of the invention which are illustrated in the drawings and otherwise, specific terminology will be resorted to for the sake of clarity. However, it is not intended that the invention be limited to the specific terms so selected and it is understood that each specific term includes all technical equivalents which operate in a similar manner to accomplish a similar purpose.

DESCRIPTION OF THE PREFERRED EMBODIMENTS

An embodiment of the present invention is an energy storage and power management system 10. In the energy storage and power management system 10, energy generated through one or more renewable energy sources and/or energy generator(s) 20, such as solar and/or wind, from another energy generation sources such as combined heat and power, biomass, gas generator, diesel generator, fuel cell, etc., or the electric grid 12, or any combination of any of these sources, is stored in an energy storage system 24, such as a battery system or capacitors, and released for use by the end user of the system 16 or released into the electric grid 12 at times when the end user's power loads 16 taken from the electric grid 12 are relatively high, or expected to be relatively high, and/or when consumption charges are relatively high, or expected to be relatively high, in order to reduce the electricity bill of the end user.

The principles and operation of an energy storage and power management system 10 according to the present invention may be better understood with reference to the drawings (FIGS. 1, 2 and 3) and accompanying descriptions.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

The energy storage and power management system 10 determines when to store energy in the energy storage system 24 and how much energy to store in the energy storage system 24 by:

(a) charging the energy storage system 24 at predetermined times with either (1) predetermined amounts of energy or (2) such amount of energy necessary to charge the energy storage system 24 to a predetermined capacity level such as, by way of example only, 80% full or 100% full;

(b) monitoring the end user's power load 16 taken from the electric grid 12 in or close to real time and, when such power load is below a predetermined level, charging the energy storage system 24 with either (1) predetermined amounts of energy or (2) such amount of energy necessary to charge the energy storage system 24 to a predetermined capacity level such as, by way of example only, 80% full or 100% full;

(c) monitoring the end user's power load 16 taken from the electric grid 12 in or close to real time and, when such power load is below the appropriate level as determined by the energy storage and power management system 10, charging the energy storage system 24 with either (1) predetermined amounts of energy or (2) such amount of energy necessary to charge the energy storage system 24 to a predetermined capacity level such as, by way of example only, 80% full or 100% full;

(d) monitoring the remaining capacity level of the energy storage system 24 and, when the remaining capacity of the energy storage system 24 drops below a predetermined level or an appropriate level as determined by the energy storage and power management system 10, charging the energy storage system 24 with (1) predetermined amounts of energy, (2) such amount of energy necessary to charge the energy storage system 24 to a predetermined capacity level such as, by way of example only, 80% full or 100% full, or (3) such amount of energy necessary to charge the energy storage system 24 to an appropriate level as determined by the energy storage and power management system 10;

(e) monitoring the remaining capacity of the energy storage system 24 and the end user's power load 16 and if it is determined insufficient capacity is available from energy storage system 24 for supplementing and/or providing energy entirely for a high demand event then turning on a natural gas and/or diesel generator(s) 20 to supplement and/or address the end user's power load 16 and/or charge the energy storage system 24 to a predetermined capacity level such as, by way of example only, 80% full or 100% full; or (f) any combination of the above.

The energy storage and power management system 10 determines when to discharge energy and/or power from the energy storage system 24 by:

(a) discharging at previously designated times and/or durations;

(b) monitoring the end user's current power load 16 taken from the electric grid 12 in or close to real-time, and discharging if the end user's current power load 16 taken from the electric grid 12 is greater than or equal to predetermined threshold levels;

(c) monitoring the end user's current power load 16 taken from the electric grid 12 in or close to real-time, and discharging if the end user's current power load 16 taken from the electric grid 12 is greater than or equal to the amount determined by the energy storage and power management system 10 to be a threshold point for reducing the end user's power load 16 taken from the electric grid 12 and/or consumption charges; or (d) any combination of the above.

The energy storage and power management system 10 determines how much energy to discharge from the energy storage system 24 at the correct power rate by:

(a) discharging previously designated amounts of energy at predetermined power rates;

(b) discharging an amount of energy calculated by monitoring the end user's current power load 16 taken from the electric grid 12 in or close to real-time and discharging only such amounts of energy stored in the energy storage system 24 as would be necessary to lower the end user's power load 16 taken from the electric grid 12 to an amount that is a little less than or equal to previously designated levels;

(c) discharging an amount of energy calculated by monitoring the end user's current power load 16 taken from the electric grid 12 in or close to real-time and discharging only such amounts of energy stored in the energy storage system 24 as would be necessary to lower the end user's power load 16 taken from the electric grid 12 to an amount that is a little less than or equal to the appropriate amount of power load to be taken from the electric grid 12 as determined by the energy storage and power management system 10; or (d) any combination of the above.

The energy storage and power management system 10 may combine any or all of the manners in which it determines when to discharge energy from the energy storage system 24 with any or all of the manners in which it determines how much energy to discharge from the energy storage system 24.

The rate at which the energy storage system 24 is charged may vary depending on the type of energy storage used by the energy storage and power management system 10, and may use charge algorithms that are known to those skilled in the art.

In a preferred embodiment of the energy storage and power management system 10, the end user's power load 16 taken from the electric grid 12 is reduced by energy discharged by the energy storage system 24 only by the amount of energy or power required for the end user to reach reduced levels, which are either predetermined or calculated by the energy storage and power management system 10, of maximum power usage taken from the electric grid 12 to the applicable target amount over a period of time, typically a billing cycle from the electric utility. By limiting the amount of energy discharged from the energy storage system 24 in this manner as opposed to discharging a fixed amount of energy from the energy storage system 24 at all applicable times, less energy is often discharged from the energy storage system 24 to attain the goal of reducing the end user's maximum power demand, or peak power demand, that is taken from the electric grid 12 over a period of time such as a billing cycle from the electric utility, which often results in (a) a prolonged life of the energy storage system 24, (b) a reduction in the number of batteries, capacitors or other components required for the energy storage system 24 to achieve its energy reduction goals, (c) reduced maintenance costs of the energy storage system 24, or (d) any combination of the above.

Referring now to the drawings, FIG. 1 is a schematic representation of the present invention. The exemplary method described is not intended to be limiting in any form or manner, and a person skilled in the art may appreciate that variations are possible in the implementation of the method.

Overall System Diagram Description:

The energy storage and power management system 10 stores energy generated from one or more renewable energy sources and/or energy generator(s) 20 and/or grid power 12 and/or energy from other energy generation sources in the energy storage system 24 and releases the stored energy from the energy storage system 24 when the end user's power load 16 that is taken from the grid power 12 is high, or expected to be high, or at predetermined times. Among the advantages of this timed release may be (a) a reduction in the end user's power load 16 that is taken from the grid power 12, and/or (b) an offset of the high consumption charges of the end user during peak usage times.

Renewable Energy Source(s) and/or Energy Generator(s) and Renewable Energy Inverter(s):

The energy storage and power management system 10 utilizes energy that is generated from the electric grid 12 and/or one or more renewable sources such as solar or wind power 20, as well as energy that is stored in an energy storage system 24. The energy storage and power management system 10 utilizes the energy created by the renewable energy sources and/or energy generator(s) 20 to work, either directly or indirectly after storage in the energy storage system 24, with the grid power 12 to fulfill the end user's power load 16. The energy created by the renewable energy sources and/or energy generator(s) 20 and/or the energy taken from the grid power 12 may be stored in the energy storage system 24, with such energy to be subsequently used to partially or fully meet the end user's power load 16.

The energy created by the renewable energy sources and/or energy generator(s) 20 is created in the form of DC power and then may be:

(a) converted to AC power by the applicable energy inverter 18 and may be (1) combined with energy taken from the grid 12 and/or energy from the energy storage system 24 to partially or fully fulfill the end user's power load 16 after passing through the end user's circuit breaker 14, (2) stored in the energy storage system 24, after passing through the end user's circuit breaker 14 and being converted to DC power by the inverter/battery charger and/or rectifier 22, (3) supplied to the grid 12 through a bi-directional meter or other manner after passing through the end user's circuit breaker 14, or (4) any combination of the above, or (b) used to charge the energy storage system 24 via the inverter/battery charger and/or rectifier 22 or through a battery charger and/or rectifier (not shown).

In a preferred embodiment, the energy storage and power management system 10 will distribute the energy created by the renewable energy sources and/or energy generator(s) 20 in accordance to the following hierarchy:

(a) First, energy created by the renewable energy sources and/or energy generator(s) 20 will be used to supplement or replace grid power 12 to meet the end user's current power loads 16;

(b) Second, if the energy created by the renewable energy sources and/or energy generator(s) 20 exceeds the end user's current power load 16, any excess renewable power created by the renewable energy sources and/or energy generator(s) 20 will be used to charge the energy storage system 24; and (c) Third, if the energy created by the renewable energy sources and/or energy generator(s) 20 exceeds the end user's power load 16 and the energy storage system 24 has no additional capacity to store additional energy at that time, the energy will be supplied to the grid 12 through a bi-directional meter or other manner.

Grid Power/Fuel-Based Generators:

The energy storage and power management system 10 is designed to use grid power and/or fuel-based generator(s) 12 to partially or fully fulfill the end user's power load 16 after passing through the end user's circuit breaker 14. In addition, grid power and/or fuel-based generator(s) 12 may be used to provide a charge to the energy storage system 24. The energy storage and power management system 10 uses either predetermined timing or real time, or close to real time, monitoring to direct energy from the grid 12 through the end user's circuit breaker 14 via inverter/battery charger and/or rectifier 22, to convert the grid power 12 from AC power to DC, to be stored in the energy storage system 24.

Energy Storage System:

The energy storage system 24 is a system to store energy, such as one or more battery systems or one or more capacitors, that is charged with either energy created from one or more renewable energy sources and/or energy generator(s) 20 or the grid power, or other energy generation 12 after, when necessary, passing through the inverter/battery charger and/or rectifier 22 which converts the power from AC to DC. Alternatively, energy created from one or more renewable energy sources and/or energy generator(s) 20 that has not been inverted from DC power to AC power by the applicable renewable energy inverter 18 may be directed through a battery charger (not shown) and/or rectifier to the energy storage system 24.

The energy storage and power management system 10 releases the energy stored in the energy storage system 24 to partially or fully fulfill end user's power load 16 through the inverter/battery charger and/or rectifier 22 and the end user's circuit breaker 14. The energy storage and power management system 10 typically will discharge energy stored in the energy storage system 24 when the end user's power load 16 that is taken from grid power 12 is, or is expected to be, at its highest levels of the day or other applicable period, which may include times when emergency back-up power and/or energy is required. The energy storage and power management system 10 is designed to release either a variable or predetermined amount of energy and power from the energy storage system 24 through either a timed release or dynamic method such as through monitoring of the end user's power load 16 that is taken from the grid 12.

The energy storage system 24 may consist of multiple distinct energy storage systems that may work in concert, opposite of each other, different from each other or any combination thereof. If the energy storage system 24 is comprised of multiple distinct energy storage systems, such distinct systems could (a) be located in the same physical location or otherwise, (b) be connected to the system at the same physical location or otherwise, such as one energy storage system being connected to the renewable energy sources and/or energy generator(s) 20 and another being connected to the grid power/energy generation 12, (c) share the same inverter/battery charger and/or rectifier 22 or otherwise, or (d) any combination of the above.

End User's Circuit Breaker:

The end user's circuit breaker 14 is the central point where at least one of energy sources 12, 20, 24 in the energy storage and power management system 10 are brought together when being used to fulfill the end user's power load 16.

End User's Power Load:

The end user's power load 16 uses the power (kW) and energy (kWh) that are being supplied by the energy storage and power management system 10 from grid power 12, and/or renewable energy source(s) and/or energy generator(s) 20, and/or the energy storage system 24. In certain cases, the energy storage and power management system 10 will monitor the end user's power load 16 taken from the grid 12 to determine when to utilize the energy stored in the energy storage system 24 and, in certain instances, at what rate such stored energy is discharged.

According to an embodiment of the present invention the discharge from the energy storage system 24 is set at one predetermined time range and duration and the charge of the energy storage system 24 is set at one predetermined time range and duration.

The energy storage and power management system 10 begins its cycle, which is typically 24 hours long, with its inverter/battery charger and/or rectifier 22 in standby mode, which means no significant amounts of energy are being charged or discharged from the energy storage system 24.

Figure 2:
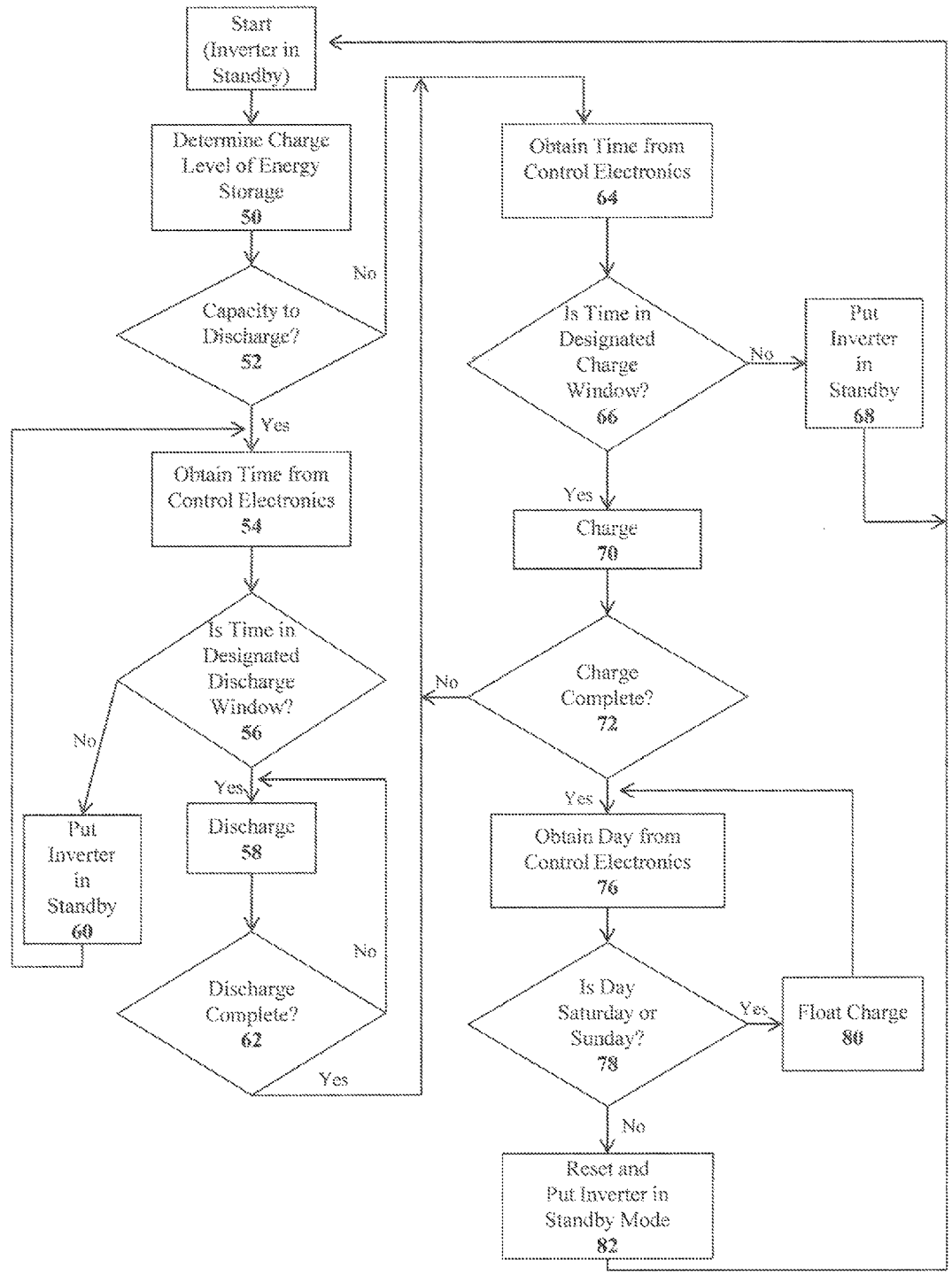
FIG. 2 is a flow chart of an embodiment of the present invention when the discharge from the energy storage system is set at one predetermined time range and duration and the charge of the energy storage system is set at one predetermined time range and duration.

Referring next to FIG. 2 which provides a flow chart of when the discharge from the energy storage system is set at one predetermined time range and duration and the charge of the energy storage system is set at one predetermined time range and duration as mentioned above.

In step 50, the energy storage and power management system 10 determines the level of energy stored in the energy storage system 24. The energy storage and power management system 10 directs the energy storage system 24 to determine, in step 52, whether or not the energy storage system 24 is sufficiently charged with energy in order to discharge. The level to which an energy storage system 24 must be charged in order for it to be sufficiently charged to discharge is based on (a) the type of energy storage device, such as battery or capacitors, (b) the chemistry of the energy storage system 24, such as lead acid or lithium if a battery system, (c) the amount, duration and/or frequency of discharge in which the energy storage system 24 is set to discharge, or (d) any combination of the above.

If the energy storage system 24 is not sufficiently charged with energy, the energy storage and power management system 10 will, as illustrated in step 64, obtain the time of day from the control electronics of the energy storage and power management system 10 to determine if it is within the predetermined range or ranges of time of day to charge the energy storage system 24.

If the energy storage device 24 is sufficiently charged with energy, in step 54 the energy storage and power management system 10 obtains the time of day from its control electronics to determine in step 56 whether the time of day is within the range of times of day in which the energy storage and power management system 10 directs the inverter/battery charger and/or rectifier 22 to discharge energy from the energy storage system 24. If in step 56 the time of day is not within the range of times in which the energy storage system 24 is directed to discharge energy, the inverter/battery charger and/ or rectifier 22 is put into standby mode in step 60, if it is not already in such mode, and the energy storage and power management system 10 returns to obtain the time in step 54, and continues such a cycle of steps 56, 60 and 54 until time of day is within the range of times in which the energy storage system 24 is directed to discharge energy.

If in step 56 the time of day is within the range of times in which the energy storage system 24 is predetermined to discharge energy, the inverter/battery charger and/or rectifier 22 is directed to discharge energy from the energy storage system 24 in step 58 at a previously determined duration and rate of discharge. After the discharge in step 58 has concluded based on the discharge parameters, the energy storage and power management system 10 then evaluates in step 62 whether the discharge is complete by (a) obtaining the time of day from the control electronics to determine whether the time of day is within the range of times of day in which the energy storage and power management system 10 directs the inverter/battery charger and/or rectifier 22 to discharge energy from energy storage system 24, (b) determining whether the capacity of the energy storage system 24 is at or below predetermined threshold levels such as 0% or 10%, or (c) any combination of the above.

If in step 62 the discharge of the energy storage system 24 is determined to be complete, the energy storage and power management system 10 will, in step 64, obtain the time of day from the control electronics of the energy storage and power management system 10 to determine whether to charge the energy storage system 24. If in step 62 the discharge of the energy storage system 24 is determined not to be complete, the energy storage and power management system 10 repeats step 58, and will continue to repeat this cycle of steps 62 and 58 until the discharge of the energy storage system 24 is complete.

In step 66, the energy storage and power management system 10 determines whether the time of day is within the predetermined range of times of day in which the energy storage and power management system 10 would direct the inverter/battery charger and/or rectifier 22 to charge the energy storage system 24. If in step 66 the time of day is not within the predetermined time range in which the inverter/battery charger and/or rectifier 22 is directed to charge the energy storage system 24, the inverter/battery charger and/or rectifier 22 is put into standby mode in step 68, if it is not already in such mode, and the energy storage and power management system 10 returns to step 64, and continues such cycle of steps 66, 68 and 64 until time of day is within the predetermined time range in which the inverter/battery charger 2 and/or rectifier 2 is directed to charge the energy storage system 24.

If in step 66 the time of day is within the range in which the inverter/battery charger and/or rectifier 22 is directed to charge the energy storage system 24, the inverter/battery charger and/or rectifier 22 is directed to charge the energy storage system 24 in step 70 at a previously determined duration and rate of charge. After the charge in step 70 has concluded based on the charging parameters, the energy storage and power management system 10 then evaluates in step 72 whether the charge is complete by (a) obtaining the time of day from the control electronics to determine whether the time of day is within the predetermined range of times of day in which the inverter/battery charger and/or rectifier 22 is directed to charge the energy storage system 24, (b) determining whether the capacity of the energy storage system 24 is at or above predetermined threshold levels such as 80% or 100%, or (c) any combination of the above.

If in step 72 the charge of the energy storage system 24 is determined to be complete, the energy storage and power management system 10 will, in step 76, obtain the day of the week from the control electronics of the energy storage and power management system 10. If in step 72 the charge of the energy storage system 24 is determined not to be complete, the energy storage and power management system 10 repeats step 64, and will continue to repeat this cycle of steps 64, 66, 70 and 72 until either (a) in step 66 the time of day is no longer in the range of time of day in which to charge the energy storage system 24 or (b) in step 72 the charge of the energy storage system 24 is complete.

Often, an end user will not want to utilize the energy from the energy storage system 24 on certain days of the week for reasons such as (a) the financial benefit of using the energy during such days is not worthwhile and/or desirable because, for example, the end user's energy usage is substantially reduced on certain days of the week such as Saturday and Sunday, (b) reducing wear and tear on the energy storage system 24, the inverter/battery charger and/or rectifier 22 and/or other components of the energy storage and power management system 10, or (c) any combination of the foregoing. FIG. 2 assumes that the end user does not want to utilize energy from the energy storage system 24 during Saturday and Sunday.

In step 78, the energy storage and power management system 10 uses the day of the week obtained in step 76 to determine whether the day of the week is one of the predetermined days of the week in which the energy storage and power management system 10 would direct the inverter/battery charger and/or rectifier 22 to charge the energy storage system 24 with a float charge 80, which is sometimes referred to as a maintenance charge. A float charge occurs when the inverter/battery charger and/or rectifier 22 charges the energy storage system 24 with only such amount of energy as is needed to maintain the then-current level of charge in the energy storage system 24. After the inverter/battery charger and/or rectifier 22 charges the energy storage system 24 with a float charge 80, the energy storage and power management system 10 repeats step 76, and will continue to repeat this cycle of steps 80, 76 and 78 until it is determined in step 78 that the day of the week is no longer one of the predetermined days of week in which the inverter/battery charger and/or rectifier 22 is directed to charge the energy storage system 24 with a float charge 80.

If in step 78 it is determined that the day of the week is not one of the predetermined days of the week in which the inverter/battery charger and/or rectifier 22 is directed to charge the energy storage system 24 with a float charge 80, then in step 82 the inverter/battery charger and/or rectifier 22 is placed in standby mode, if it is not already in such mode, and the energy storage and power management system 10 is ready to be restarted either manually or automatically, and commence again with step 50.

According to a further embodiment of the present invention, the discharge from the energy storage system 24 occurs when the end user's power load 16 taken from the electric grid 12 is in excess of a predetermined threshold and the charge of the energy storage system 24 is set at one predetermined level to insure the energy storage has adequate capacity to support the discharge The energy storage and power management system 10 begins its cycle, which generally consists of 24 hours, with its inverter/battery charger and/or rectifier 22 in standby mode.

Figure 3:
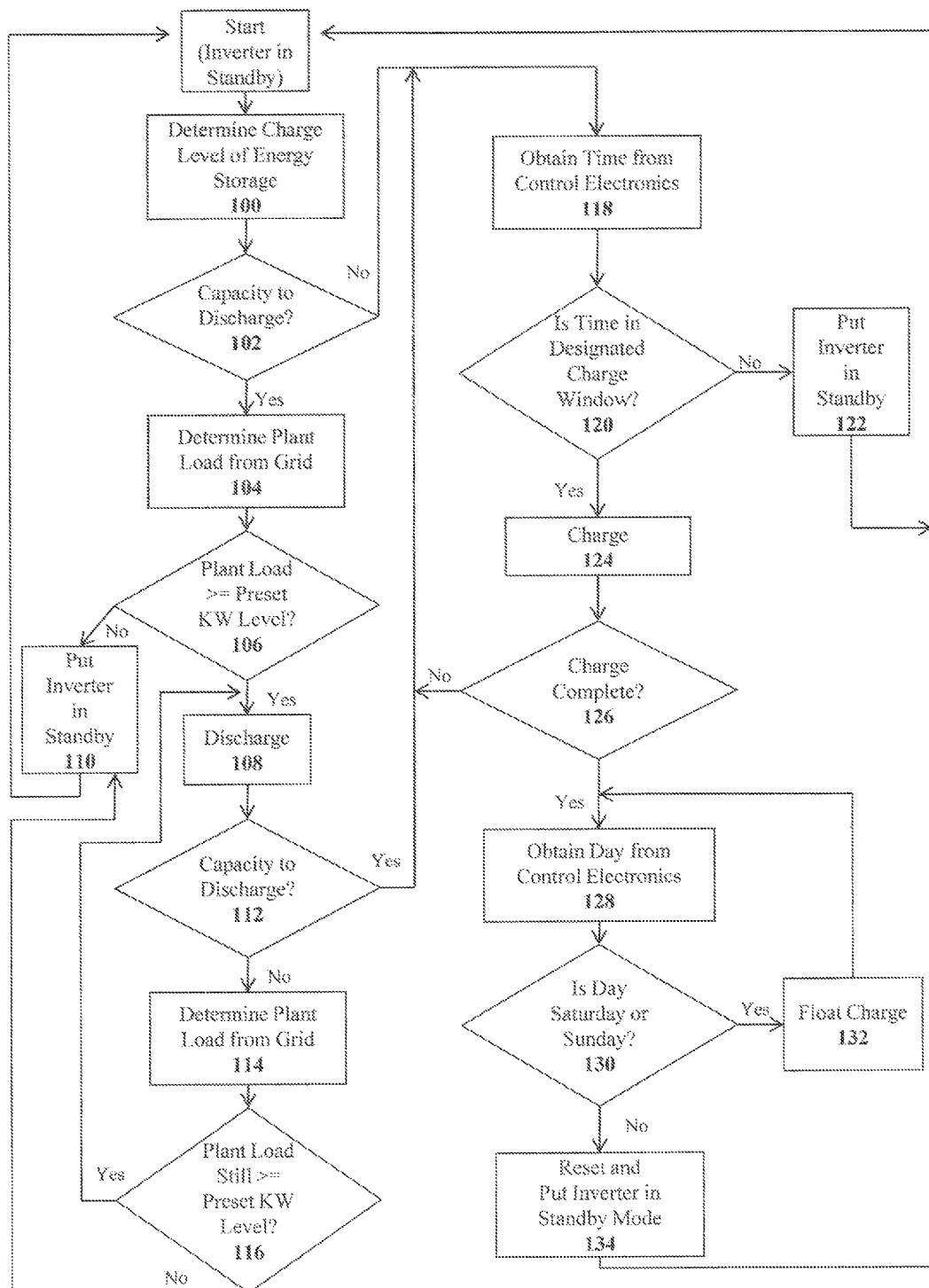
FIG. 3 is a flow chart of an embodiment of the present invention when the discharge from the energy storage system occurs when the end user's power load taken from the electric grid is in excess of a predetermined threshold and the charge of the energy storage system is set at one predetermined time range and duration.

Referring next to FIG. 3 in step 100, the energy storage and power management system 10 determines the level of energy then stored in the energy storage system 24, and in step 102 determines if the energy storage system 24 is sufficiently charged to a predetermined charge, such as 20%, 50% or 80% charged by way of example only, with energy in order to discharge should the energy storage and power management system 10 direct it to do so. The level to which an energy storage system 24 must be charged in order for it to be sufficiently charged to be able to discharge may or may not be a predetermined threshold and is based on (a) the type of energy storage system 24, such as battery or capacitors, (b) the chemistry of the energy storage system 24, such as lead acid or lithium if a battery system, (c) the amount, duration and/or frequency of discharge in which the energy storage system 24 is set to discharge, or (d) any combination of the above.

If the energy storage system 24 is not sufficiently charged with energy, the energy storage and power management system 10 will, as indicated in step 118, obtain the time of day and or/customer usage as compare to the preset power threshold from the control electronics of the energy storage and power management system 10 to determine if it is within the predetermined range or ranges of time of day to charge the energy storage system 24.

If the remaining capacity of the energy storage system 24 is not sufficient and the end user's power load 16 is at or above a predetermined range or ranges, a natural gas and/or diesel generator(s) 20 may be engaged to supplement and/or address the end user's power load 16 and/or charge the energy storage system 24 to a predetermined capacity level such as, by way of example only, 80% full or 100% full (not shown).

If the energy storage device 24 is sufficiently charged with energy, in step 104 the energy storage and power management system 10 determines in real-time or close to real-time the end user power load 16 taken from the electric grid 12, which is determined by (a) taking such reading from the end user's circuit breaker 14, (b) subtracting from grid power all amounts of other energy being contributed to the end user's power load 16, such as one or more renewable energy sources, such as CHP, biomasses etc and/or energy generator(s) 20, (c) as otherwise determined by the energy storage and power management system 10, or (d) any combination of the foregoing.

If in step 106 the end user's power load 16 taken from the electric grid 12 is not at or in excess the predetermined threshold at which the energy storage system 24 is directed to discharge energy, the inverter/battery charger and/or rectifier 22 is put into standby mode in step 110, if it is not already in such mode, and the energy storage and power management system 10 returns to step 100.

If in step 106 the end user power load 16 taken from the electric grid 12 is at or in excess the predetermined threshold at which the energy storage system 24 is directed to discharge energy, in step 108, the inverter/battery charger and/or rectifier 22 is directed to discharge energy from the energy storage system 24 at a previously determined rate of discharge for a previously determined duration of discharge, such as for 1 second, 30 seconds or 5 minutes.

After the discharge in step 108 has concluded based on the discharge parameters, the energy storage and power management system 10 then evaluates in step 112 whether the energy storage system 24 is sufficiently charged, e.g., 20% charged, 50% charged or 80% charged, with energy in order to discharge should the energy storage and power management system 10 direct it to do so. The level to which an energy storage system 24 must be charged in order for it to be sufficiently charged to be able to discharge may or may not be a predetermined threshold and is based on (a) the type of energy storage system 24, such as battery or capacitors, (b) the chemistry of the energy storage system 24, such as lead acid or lithium if a battery system, (c) the amount, duration and/or frequency of discharge in which the energy storage system 24 is set to discharge, or (d) any combination of the above.

If the energy storage system 24 is not sufficiently charged with energy, the energy storage and power management system 10 will, as indicated in step 118, obtain the time of day from the control electronics of the energy storage and power management system 10 to determine if it is within the predetermined range or ranges of time of day to charge the energy storage system 24 and/or determine if the customer load 16 is at a value such that charging the energy storage system 24 would not increase the customer's peak demand charge.

If the energy storage device 24 is sufficiently charged with energy, in step 114 the energy storage and power management system 10 determines in real-time or close to real-time the end user power load 16 taken from the electric grid 12, which is determined by (a) taking such reading from the end user's circuit breaker 14, (b) subtracting from grid power all amounts of other energy being contributed to the end user's power load 16, such as one or more renewable energy sources and/or energy generator(s) 20, (c) as otherwise determined by the energy storage and power management system 10, or (d) any combination of the foregoing.

If in step 116 the end user's power load 16 taken from the electric grid 12 is no longer at or in excess the predetermined threshold at which the energy storage system 24 is directed to discharge energy, the inverter/battery charger and/or rectifier 22 is put into standby mode in step 110 and the energy storage and power management system 10 returns to step 100.

If in step 116 the end user power load 16 taken from the electric grid 12 remains at or in excess the predetermined threshold at which the energy storage system 24 is directed to discharge energy, then the energy storage and power management system 10 repeats step 108, and will continue to repeat this cycle of steps 108, 112, 114 and 116 until either (a) it is determined in step 112 that the energy storage system 24 no longer has a capacity to discharge or (b) it is determined in step 116 that the end user's power load 16 taken from the electric grid 12 is no longer at or in excess the predetermined threshold at which the energy storage system 24 is directed to discharge energy.

At step 118, the time of day and real-time user demand is obtained from the control electronics of the energy storage and power management system 10 to determine if it is appropriate to charge the energy storage system 24. In step 120, the energy storage and power management system 10 determines whether the time of day is within the predetermined range of times of day and/or customer demand level in which the energy storage and power management system 10 would direct the inverter/battery charger and/or rectifier 22 to charge the energy storage system 24. If in step 120 the time of day and/or customer demand level is not within the predetermined time range in which the inverter/battery charger and/or rectifier 22 is directed to charge the energy storage system 24, the inverter/battery charger and/or rectifier 22 is put into standby mode in step 122, if it is not already in such mode, and the energy storage and power management system 10 returns to step 100.

If in step 120 the time of day and/or customer demand level is within the range in which the inverter/battery charger and/or rectifier 22 is directed to charge the energy storage system 24, the inverter/battery charger and/or rectifier 22 is directed to charge the energy storage system 24 in step 124 at a previously determined rate of charge for a previously determined duration of charge such as for 1 second, 30 seconds or 5 minutes. After the charge in step 124 has concluded based on the charging parameters, the energy storage and power management system 10 then evaluates in step 126 whether the charge is complete by (a) obtaining the time of day from the control electronics to determine whether the time of day and/or customer demand level is within the predetermined range of times of day in which the inverter/battery charger and/or rectifier 22 is directed to charge the energy storage system 24, (b) determining whether the capacity of the energy storage system 24 is at or above predetermined threshold levels such as 80% or 100%, or (c) any combination of the foregoing.

If in step 126 the charge of the energy storage system 24 is determined to be complete, the energy storage and power management system 10 will, in step 128, obtain the day of the week and/or customer demand level from the control electronics of the energy storage and power management system 10. If in step 126 the charge of the energy storage system 24 is determined not to be complete, the energy storage and power management system 10 repeats steps 118, and will continue to repeat this cycle of steps 118, 120, 124 and 126 until either (a) the charge of the energy storage system 24 is complete as determined in step 126 or (b) as determined in step 120 the time of day and/or customer demand level is no longer within the predetermined range of times of day in which the energy storage and power management system 10 would direct the inverter/battery charger and/or rectifier 22 to charge the energy storage system 24

Often, an end user will not want to utilize the energy from the energy storage system 24 on certain days of the week for reasons such as (a) the financial benefit of using the energy during such days is not worthwhile and/or desirable because, for example, the end user's energy usage is substantially reduced on certain days of the week such as Saturday and Sunday, (b) reducing wear and tear on the energy storage system 24, the inverter/battery charger and/or rectifier 22 and/or other components of the energy storage and power management system 10, or (c) any combination of the above. FIG. 3 assumes that the end user does not want to utilize energy from the energy storage system 24 during Saturday and Sunday.

In step 130, the energy storage and power management determines whether the day of the week is one of the predetermined days of the week in which the energy storage and power management system 10 would direct the inverter/battery charger and/or rectifier 22 to charge the energy storage system 24 with a float charge 132. After the inverter/battery charger and/or rectifier 22 charges the energy storage system 24 with a float charge 132, the energy storage and power management system 10 repeats step 128, and will continue to repeat this cycle of steps 128, 130 and 132 until it is determined in step 130 that the day of the week is no longer one of the predetermined days of the week in which the inverter/battery charger and/or rectifier 22 is directed to charge the energy storage system 24 with a float charge 132.

If in step 130 it is determined that the day of the week is not one of the predetermined days of the week in which the inverter/battery charger and/or rectifier 22 is directed to charge the energy storage system 24 with a float charge 132, then in step 134 the inverter/battery charger and/or rectifier 22 is placed in standby mode, if it is not already in such mode, and the energy storage and power management system 10 is ready to be restarted either manually or automatically, and commence again with step 100.

It should be understood that the invention is not limited in its application to the details of construction and arrangements of the components set forth herein. The invention is capable of other embodiments and of being practiced or carried out in various ways. Variations, alternations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

What is claimed:

1. A power management system for reducing peaks of power demand from an electric grid by a power load in a power supply system having an energy storage system and at least one onsite connected energy source; comprising:
   a circuit breaker;
   an energy storage system inverter operative to perform at least one of electrical inversion and charging; and
   an energy inverter operative to perform at least one of electrical inversion and rectifying, wherein
   said circuit breaker is connected to said electric grid and at least one of said energy inverter, said energy storage system inverter and said power load,
   said energy inverter being also connected to said at least one onsite connected energy source,
   said energy storage system inverter being connected to said at least one onsite connected energy source and to said energy storage system and via said circuit breaker to the power load,
   wherein said system is configured to
   charge the energy storage system with power from said at least one onsite connected source and/or said electric grid, and to
   provide power to said power load or to said grid from said at least one onsite connected energy source or said energy storage system,
   wherein said system is configured to store energy in the energy storage system and to determine the amount of energy to be stored by performing at least one of the following steps:
   (a) charging the energy storage system at predetermined times;
   (b) monitoring the power load taken from the electric grid and, when such power load is detected to fall below a predetermined level, charging the energy storage system;
   (c) monitoring the power load taken from the electric grid and, when such power load is below the appropriate level as determined by the power management system, charging the energy storage system; and
   (d) monitoring the remaining capacity level of the energy storage system and, when the remaining capacity of the energy storage system drops below a predetermined level or an appropriate level as determined by the power management system, charging the energy storage system.

2. A power management system according to claim 1, wherein said system is configured to release energy or power from the energy storage system by performing at least one of the following steps:
   (a) discharging at previously designated times or durations;
   (b) monitoring the current power load taken from the electric grid, and discharging, if the current power load taken from the electric grid is greater than or equal to predetermined threshold levels; and
   (c) monitoring the current power load taken from the electric grid, and discharging, if the current power load taken from the electric grid is greater than or equal to the amount determined by the power management system to be a threshold point for reducing the power load taken from the electric grid.

3. A power management system according to claim 1, wherein said system is configured to determine the amount of energy to be discharged from the energy storage system at the correct power rate by performing at least one of the following steps:
(a) discharging at previously designated times amounts of energy at predetermined power rates;
(b) discharging an amount of energy calculated by monitoring the current power load taken from the electric grid and discharging only such amounts of energy stored in the energy storage system as would be necessary to lower the power load taken from the electric grid to an amount that is a little less than or equal to previously designated levels; and
(c) discharging an amount of energy calculated by monitoring the end current power load taken from the electric grid and discharging only such amounts of energy stored in the energy storage system as would be necessary to lower the power load taken from the electric grid to an amount that is a little less than or equal to the appropriate amount of power load to be taken from the electric grid as determined by the power management system.

4. A power management system according to claim 1, wherein the energy source system is configured to generate DC power, the power management system being configured to
(a) use the DC power to charge the energy storage system via the energy storage system inverter and/or
(b) invert the DC power to AC power by the energy inverter and to perform at least one of the following steps:
(1) combine said AC power with energy taken from the grid or energy from the energy storage system to partially or fully fulfill the requirement of power load after passing through the circuit breaker,
(2) store said AC power in the energy storage system, after passing through the circuit breaker and after being converted to DC power by the energy storage system inverter, and
(3) supply said AC power to the grid through a bidirectional meter or other manner after passing it through the circuit breaker.

5. A power management system according to claim 1, wherein said power management system is configured to distribute the energy generated by said at least one onsite connected energy source in accordance with the following hierarchy:
(a) first, energy generated by the at least one onsite connected energy source is used to supplement or replace grid power to meet the current power loads;
(b) second, if the energy generated by said at least one onsite connected energy source exceeds the current power load, any excess power generated by said at least one onsite connected energy source is used to charge the energy storage system; and
(c) third, if the energy generated by said at least one onsite connected energy source exceeds the current power load and the energy storage system has no additional capacity to store additional energy at that time, the energy is supplied to the grid through a bidirectional meter.

6. A power management system according to claim 1, wherein said power management system is configured to use grid power to partially or fully fulfill the requirement of power load after passing through the circuit breaker.

7. A power management system according to claim 1, wherein said energy storage system comprises one or more distinct energy sub-storage systems, that are connected to the system at the same physical location or wherein one energy sub-storage system is connected to at least one of said at least one onsite connected energy source and another sub-storage is connected to the grid power or wherein at least one said energy storage sub-system has its own energy storage system inverter or at least two said energy storage sub-systems share the same energy storage system inverter.

8. A power management system according to claim 1, wherein said energy storage system inverter and said energy inverter are integrated into a single device, or wherein said circuit breaker, said energy storage system inverter and said energy inverter are integrated in a single device.

9. A power management system according to claim 1, wherein said energy source comprises a solar renewable energy source or a wind renewable energy source.

10. A power management system according to claim 1, wherein said energy storage system comprises one of a battery system and capacitors.

11. A power management system according to claim 1, wherein said charging the energy storage system comprises charging the energy storage system with one of:
predetermined amounts of energy,
such amounts of energy necessary to charge the energy storage system to a predetermined capacity level between 80% to 100% full, and
such amount of energy necessary to charge the energy storage system to an appropriate level as determined by the power management system.

12. A power management system according to claim 1, wherein each said monitoring is performed in or close to real-time.

13. A power management system according to claim 1, wherein said power management system is connected to said electric grid, to said at least one onsite connected energy source, to said energy storage system and to said power load.

14. A method for reducing peaks of power demand on an electric grid or on the utility grid, by a power management system comprising an energy storage system inverter in a standby mode, the method comprising:
determining a level of energy stored in an energy storage system,
determining whether or not said energy storage system is sufficiently charged with energy in order to be discharged,
if the energy storage system is not sufficiently charged, obtaining a time of day, to be determined, and
if said obtained time of day is not within the predetermined time range in which the energy storage system inverter is directed to charge the energy storage system, putting the inverter charger into standby mode,
if said obtained time of day is determined to be within the range in which the energy storage system inverter is directed to charge the energy storage system, charging the energy storage system at a previously determined duration and rate of charge, and after said charging has been concluded, evaluating whether said charging is completed,
if it is determined that said charging of the energy storage system is not complete, returning to said obtaining of time step,
if it is determined that the charging operation has been completed, obtaining the day of the week, and determining if said obtained day of the week is Sunday or Saturday, if said obtained day of the week is not Sunday or Saturday, reset and put inverter into Standby mode, and if said obtained day of the week is Sunday or Saturday, float charging said energy storage system, and returning to said obtaining of the day of the week and said following steps.

15. The method according to claim 14, wherein if it has been determined that the energy storage device is sufficiently charged, obtaining the time of day, determining whether said obtained time of day is within a range of times of day to discharge energy from the energy storage system, if it is determined that said obtained time of day is not within said range of times in which the energy storage system is directed to discharge energy, putting said energy storage system inverter into standby mode, and, returning to said obtaining the time and the following steps, if it is determined that said obtained time of day is within said range of times in which the energy storage system is directed to discharge energy, discharging energy from the energy storage system by the energy storage system inverter based on discharge parameters, after the discharge has been concluded based on said discharge parameters, determining whether the discharge is complete, if the discharge is determined to be complete, returning to said obtaining of said time of day and said following steps, if said discharge is determined not to be complete repeating said discharging, until the discharge is determined to be complete.

16. The method according to claim 14, wherein:

if it has been determined that the energy storage device is sufficiently charged, determine the power load taken from the electric grid, determining if the power load taken from the electric grid is not at or in excess of a predetermined threshold at which the energy storage system is directed to discharge energy, if said power load taken from the electric grid is not at or in excess of said predetermined threshold, putting said energy storage system inverter into standby mode, if said power load taken from the electric grid is at or in excess of said predetermined threshold, discharge energy from the energy storage system according to determined discharge parameters, after the discharge has been concluded, return to said determining step whether the energy storage system is still sufficiently charged with energy.

17. A computer program product comprising:

a non-transitory, computer-readable storage medium; and computer-readable program code embodied in the storage medium, wherein the computer-readable program code is configured to perform the steps of claim 14.

\* \* \* \* \*